(12) United States Patent
Arai et al.

(10) Patent No.: US 8,130,427 B2
(45) Date of Patent: Mar. 6, 2012

(54) METHOD AND APPARATUS FOR GENERATING ORIGIN SIGNAL OF ENCODER

(75) Inventors: Kouichi Arai, Utsunomiya (JP); Kazuhiko Kodama, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 188 days.

(21) Appl. No.: 11/419,894

(22) Filed: May 23, 2006

(65) Prior Publication Data

US 2006/0268379 A1    Nov. 30, 2006

(30) Foreign Application Priority Data

May 25, 2005    (JP) ................. 2005-152224

(51) Int. Cl.
- G01B 11/30    (2006.01)
- G01C 11/12    (2006.01)
- G06K 9/00    (2006.01)
- G05B 11/18    (2006.01)
- H04N 1/46    (2006.01)
- H04N 1/46    (2006.01)

(52) U.S. Cl. ........ 358/504; 356/610; 250/558; 382/103; 318/594; 358/537; 358/538

(58) Field of Classification Search .......... 358/1.9, 358/296, 409, 412, 435, 474, 500, 507, 515, 358/616; 356/616, 610, 2; 382/103; 318/594, 318/636, 610, 599, 621, 601, 602, 603; 399/202, 399/200; 348/168

See application file for complete search history.

(56) References Cited

U.S. PATENT DOCUMENTS

| | | | | |
|---|---|---|---|---|
| 3,638,025 A * | 1/1972 | Dishington et al. | .......... | 382/103 |
| 3,914,538 A * | 10/1975 | Perreault et al. | .............. | 358/435 |
| 4,145,991 A * | 3/1979 | DiMatteo et al. | ............. | 356/610 |
| 4,231,061 A * | 10/1980 | Freeman | ........................ | 358/507 |
| 4,259,017 A * | 3/1981 | Ross et al. | .................... | 356/610 |
| 4,269,513 A * | 5/1981 | DiMatteo et al. | ............. | 356/610 |
| 4,325,086 A * | 4/1982 | Sato et al. | ..................... | 358/296 |
| 4,443,706 A * | 4/1984 | DiMatteo et al. | ............. | 356/610 |
| 4,511,252 A * | 4/1985 | Di Matteo et al. | ............ | 356/610 |
| 4,621,224 A * | 11/1986 | Watabe et al. | ............... | 318/594 |
| 4,627,708 A * | 12/1986 | Arai et al. | ..................... | 399/200 |
| 4,970,668 A | 11/1990 | Satoh et al. | | |
| 5,132,786 A * | 7/1992 | Ishiwata | ........................ | 358/500 |
| 5,260,811 A * | 11/1993 | Morikawa | ..................... | 358/474 |
| 5,313,462 A * | 5/1994 | Fujino et al. | .................. | 358/409 |
| 5,329,385 A * | 7/1994 | Washio | ......................... | 358/515 |
| 5,424,763 A * | 6/1995 | Komiya et al. | ................ | 358/412 |
| 5,627,570 A * | 5/1997 | Hiramatsu et al. | .............. | 347/19 |
| 6,026,232 A * | 2/2000 | Yogeshwar et al. | .......... | 358/538 |
| 6,325,478 B1 * | 12/2001 | Imai et al. | ..................... | 358/1.9 |
| 6,342,697 B1 * | 1/2002 | Nagai et al. | ................... | 356/616 |

(Continued)

FOREIGN PATENT DOCUMENTS

EP    0453971    10/1991

(Continued)

Primary Examiner — King Poon
Assistant Examiner — Akwasi M Sarpong
(74) Attorney, Agent, or Firm — Rankin, Hill & Clark LLP (57) ABSTRACT

When generating an origin signal of an encoder having a scale on which an incremental pattern and the origin pattern are formed, an origin signal having a necessary position and width is generated by software based on an origin waveform obtained from the origin pattern. This enables origin detection with excellent repeatability, S/N ratio (pulse width), and bidirectionality while maintaining ease of mounting and adjustment.

3 Claims, 7 Drawing Sheets

U.S. PATENT DOCUMENTS

| | | | |
|---|---|---|---|
| 2002/0048470 A1 * | 4/2002 | Kanno | 399/205 |
| 2005/0078015 A1 | 4/2005 | Ferran et al. | |

FOREIGN PATENT DOCUMENTS

| | | |
|---|---|---|
| JP | 2000-097726 | 4/2000 |
| JP | 2000-275063 | 10/2000 |
| JP | 2002-310726 | 10/2002 |
| JP | 2003-083771 | 3/2003 |
| JP | 2003-294494 | 10/2003 |
| JP | 2004-016330 | 1/2004 |

\* cited by examiner

Fig.1

PRIOR ART

Origin pattern (Positive)

Origin pattern (Negative)

Fig.2

PRIOR ART

Origin waveform is obtained at the same position regardless of whether detection head moves to the right or left

METHOD AND APPARATUS FOR GENERATING ORIGIN SIGNAL OF ENCODER

CROSS-REFERENCE TO RELATED APPLICATION

The disclosure of Japanese Patent Application No. 2005-152224 filed on May 25, 2005 including specifications, drawings and claims is incorporated herein by reference in its entirety.

BACKGROUND OF THE INVENTION

1. Field of the Invention

The present invention relates to a method and an apparatus for generating an origin signal of an encoder that has a scale on which an incremental pattern and an origin pattern are formed. In particular, the invention relates to a method and an apparatus for generating an origin signal of an encoder, by which the origin signal can be generated with high precision irrespective of origin waveforms obtained from the origin pattern.

2. Description of the Related Art

Figure 1:
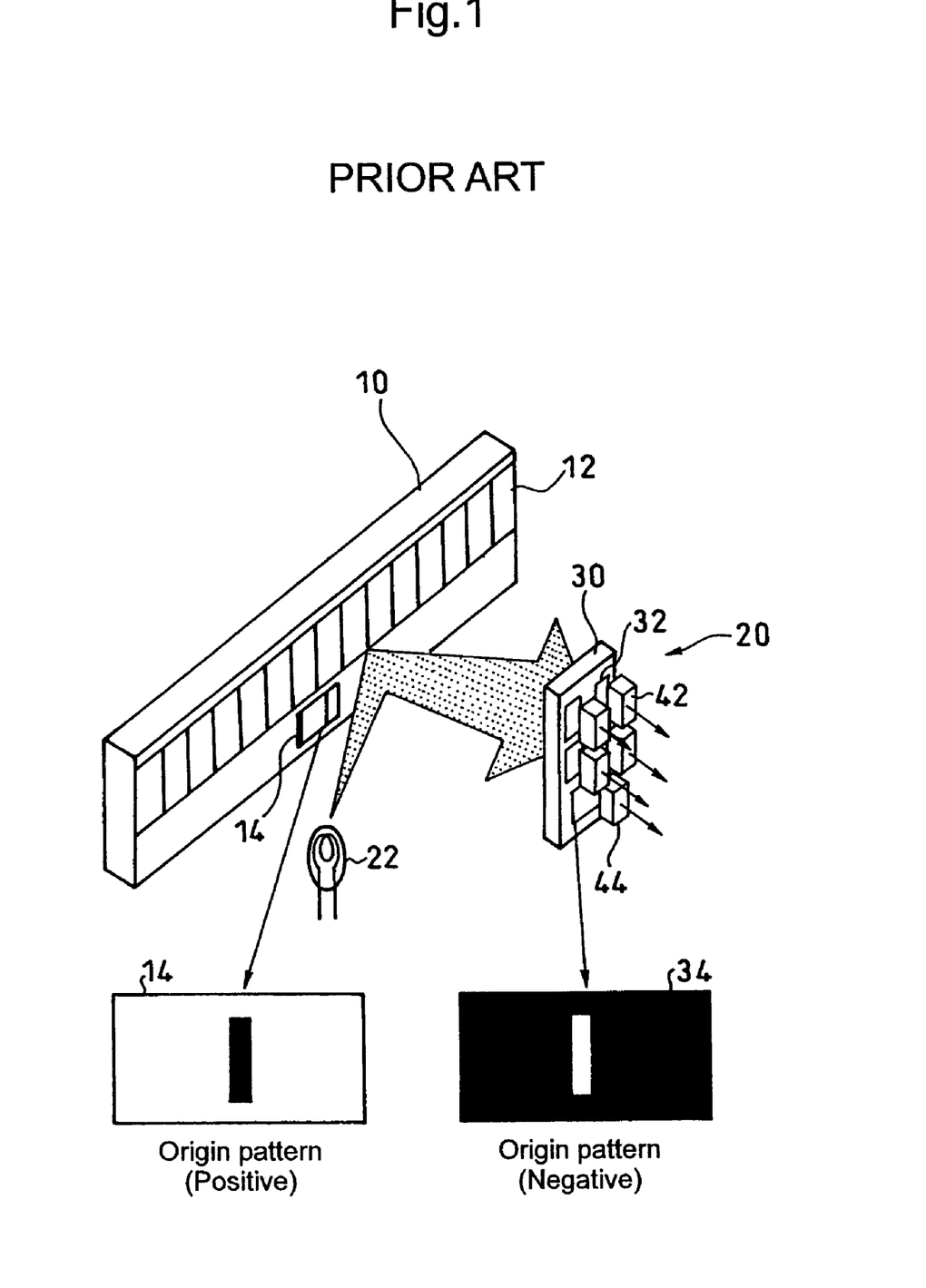
FIG. 1 is a perspective view for explaining an origin detection unit of a conventional encoder.
Figure 2:
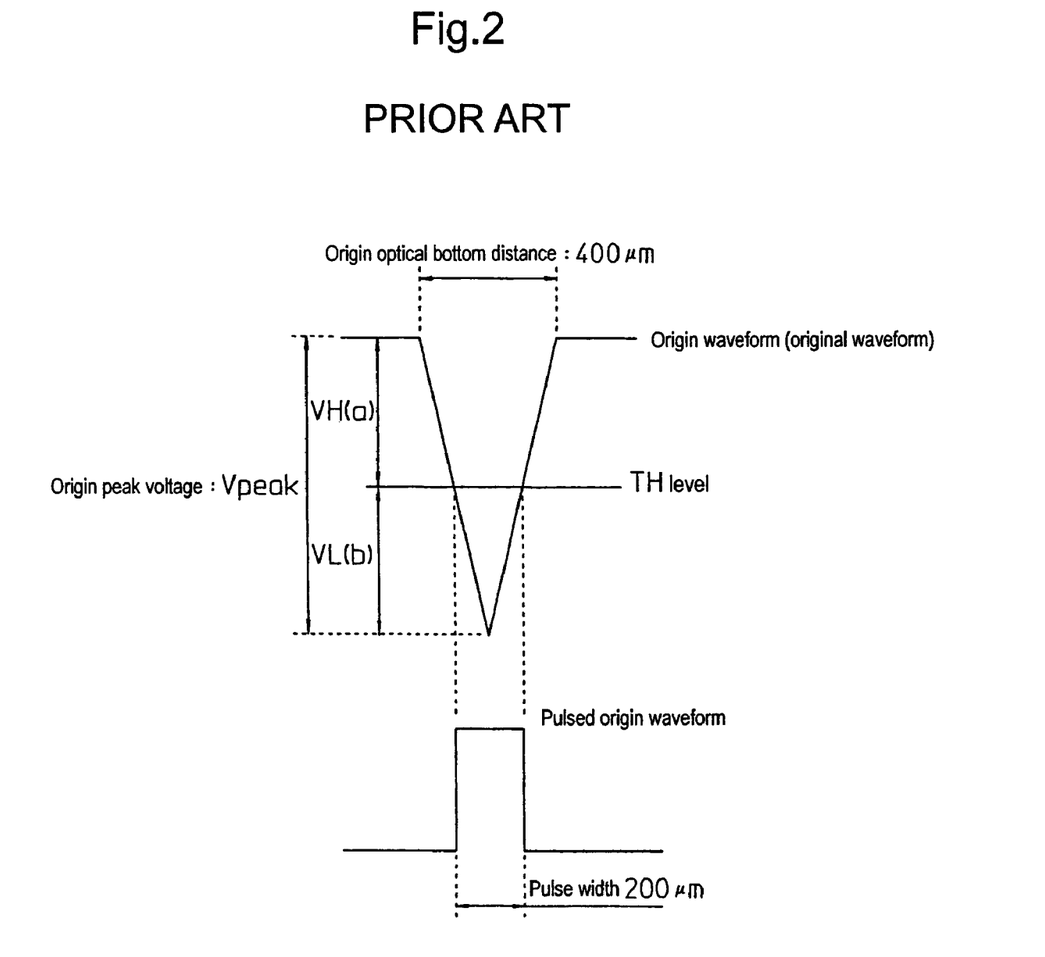
FIG. 2 is a signal waveform chart for explaining the same.

FIG. 1 shows an encoder that obtains an incremental displacement signal (referred to as main signal) by using a scale 10 on which an incremental pattern 12 is formed. An origin pattern 14 is formed beside the incremental pattern 12 if it is necessary to acquire the point of origin on the scale 10. As shown in FIG. 2, an origin waveform is obtained from this origin pattern 14, and a pulsed origin waveform signal is then determined (see Japanese Patent Laid-Open Publications Nos. 2000-97726, 2000-275063, 2003-294494, and 2004-16330).

In FIG. 1, the reference numeral 20 designates a detection head which includes a light source 22, an index scale 30, four main signal light-receiving devices 42, and an origin light-receiving device 44. The index scale 30 is provided with patterns 32 and 34 corresponding to the incremental pattern 12 and the origin pattern 14, respectively. The main signal light-receiving devices 42 acquire respective four phases of output for the sake of direction discrimination and phase division.

This method is highly tolerant to mounting and relative-movement plays such as in the gap, arrangement, and orientation of the detection head 20 with respect to the scale 10. Nevertheless, the method also has had a problem of poor performances in use, including repeatability and bidirectionality.

In the meantime, encoders have improved in resolution and precision recently, and a demand for origin signals of higher precisions has become increasingly larger. It has thus been desired that the origin signals have resolution and precision equivalent to those of main signals, and be output in synchronization with the timing of the main signals as well. Japanese Patent Laid-Open Publication No. 2003-83771 describes the acquisition of an origin signal synchronous with a main signal.

Even with the technique described in Japanese Patent Laid-Open Publication No. 2003-83771, however, it has been impossible to output an origin pulse that is adaptable to necessary origin pulse widths.

SUMMARY OF THE INVENTION

In view of the foregoing problems, various exemplary embodiments of this invention enable origin detection with excellent repeatability, S/N ratio (pulse width), and bidirectionality while maintaining ease of mounting and adjustment.

To solve the foregoing problems, various exemplary embodiments of this invention provide a method of generating an origin signal of an encoder having a scale on which an incremental pattern and the origin pattern are formed, the method comprising generating an origin signal having a necessary position and width by software based on an origin waveform obtained from the origin pattern.

The origin signal may be generated based on an origin position detected by an initial operation after power-on.

The origin signal may also be generated in synchronization with a main signal waveform obtained from the incremental pattern.

To solve the foregoing problems, various exemplary embodiments of this invention also provide an apparatus for generating an origin signal of an encoder having a scale on which an incremental pattern and an origin pattern are formed, the apparatus comprising: means for obtaining an origin waveform from the origin pattern; and means for generating an origin signal having a necessary position and width by software based on the origin waveform.

The apparatus may also comprise means for storing an origin position and the width of the origin signal detected by an initial operation after power-on.

The apparatus may also comprise: means for obtaining a main signal waveform from the incremental pattern; and means for generating the origin signal in synchronization with the main signal waveform obtained from the incremental pattern.

According to the present invention, it is possible for users to set an origin point to a necessary position and width flexibly after power-on. Obtaining the origin signal of necessary width, it is therefore possible to secure a sufficient S/N ratio and establish a bidirectional origin.

More specifically, the origin track is actually detected in the first operation alone, while the origin signal is subsequently generated and output virtually by software. This solves the conventional problems that the origin slightly shifts in position each time it is detected, and that the origin signal varies in width. Since the origin signal is generated and output by software, it is also possible to preclude any positional shift of the origin signal regardless of whether the detection head is moving to the right or to the left. Furthermore, it is possible to locate an origin with an arbitrary offset from the origin position detected by the initial operation, and then generate and output an origin signal each time the detection head passes that point (which achieves the function for free origin setting).

The origin detection essentially has to be performed only once at the beginning. In the meantime, numerical control (NC) units to be connected with the encoder have, by specifications, the function of checking the origin signal each time the origin is passed. Thus, if the origin signal is generated and output accordingly by software, it is possible to maintain compatibility with conventional encoders and resolve the positional shift of the origin signal as well. By using software, it is also possible to set the position and the width of the origin signal freely according to the specifications of the NC units.

In particular, when the rising edge of the scale origin is used as a slowdown watchdog signal (a trigger signal intended for a zero return operation) so that the rise of the origin or that of the origin inverted is put to subsequent use, it becomes possible to program the origin settings with a position and pulse width convenient for the system. This makes it possible to optimize (reduce) the zero return time.

Figure 3:
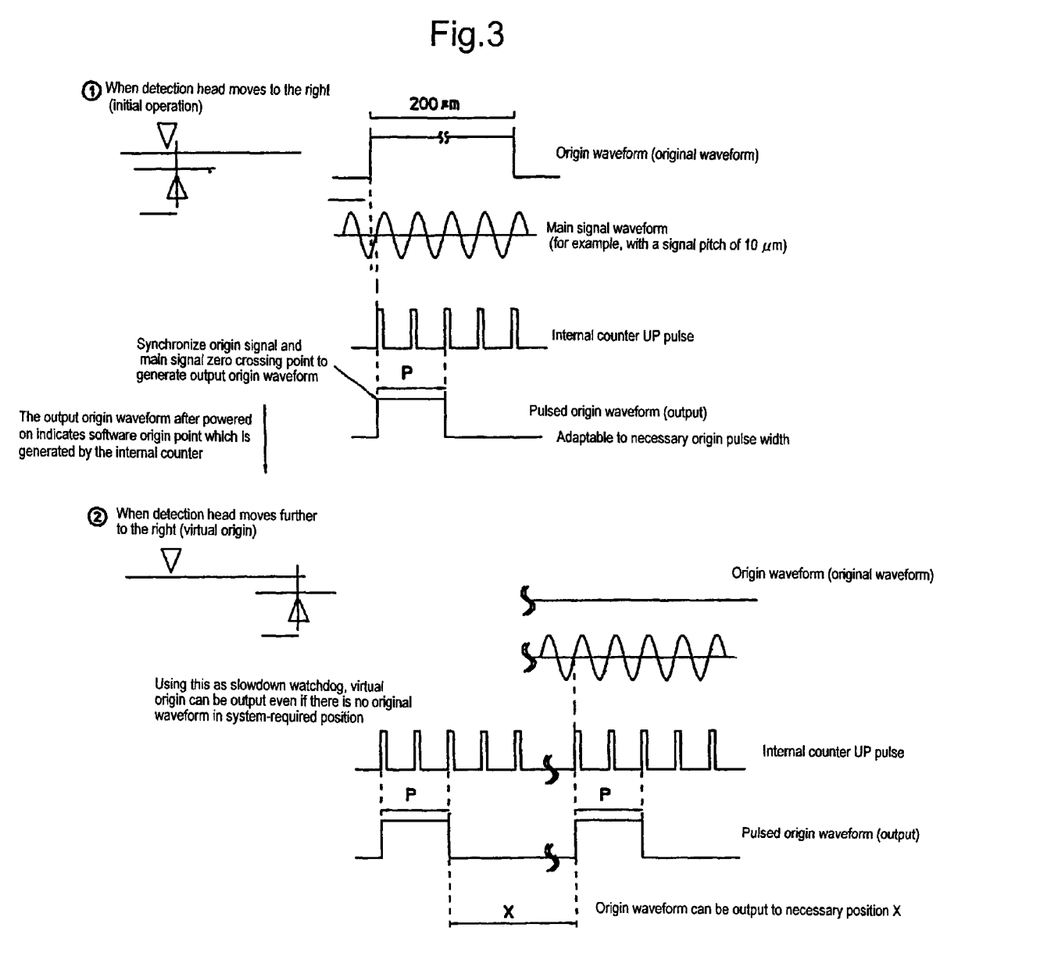
FIG. 3 is an explanatory diagram showing the virtual output of an origin according to the present invention, for situations where the initial origin is used as a slowdown watchdog.

Moreover, even if the scale is provided with a single origin alone, as shown in FIG. 3, it is possible to utilize the single origin as a slowdown watchdog while programming origin settings intended for zero coordinates to necessary positions.

Figure 4:
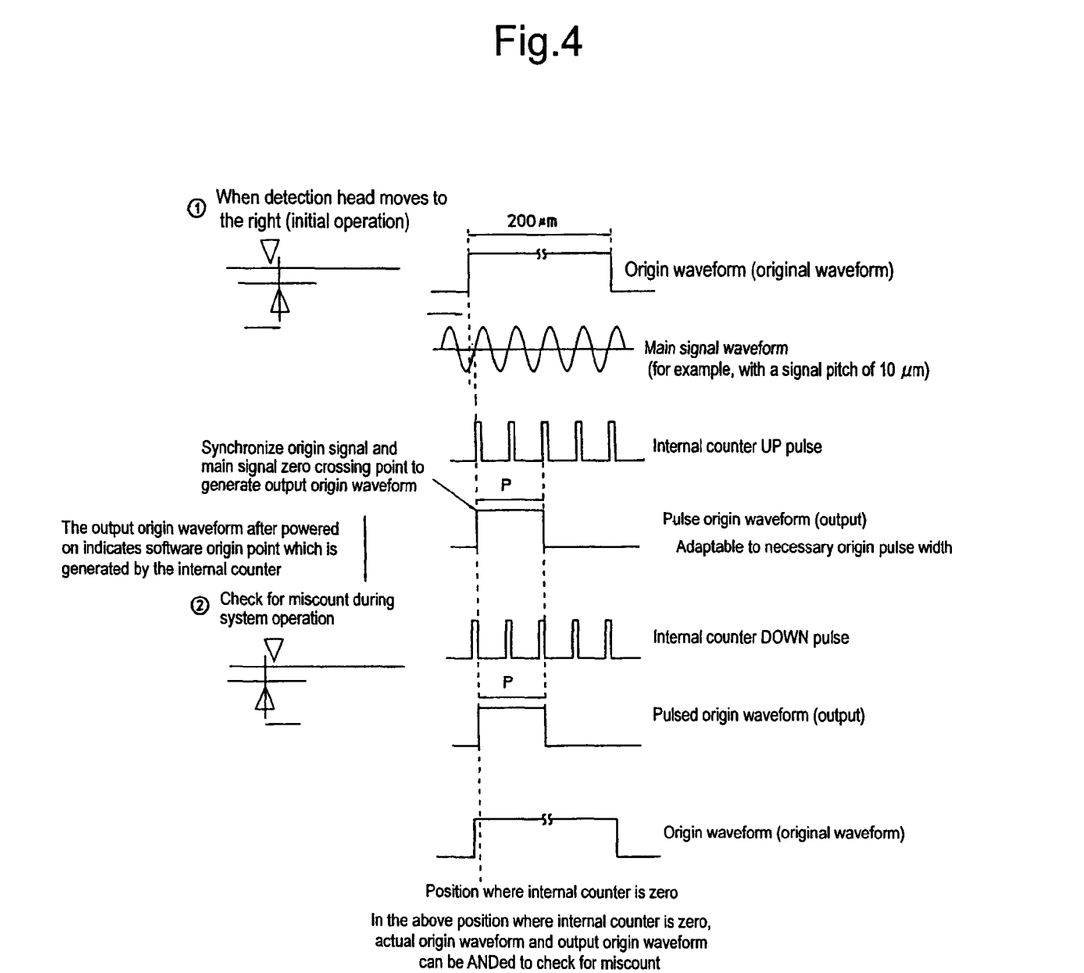
FIG. 4 is an explanatory diagram showing how to check for a system miscount according to the present invention.

As shown in FIG. 4, the origin outputs obtained from the actual origin and the zero coordinates can be ANDed to check for a miscount.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, an exemplary embodiment of the present invention will be described in detail with reference to the drawings.

Figure 5:
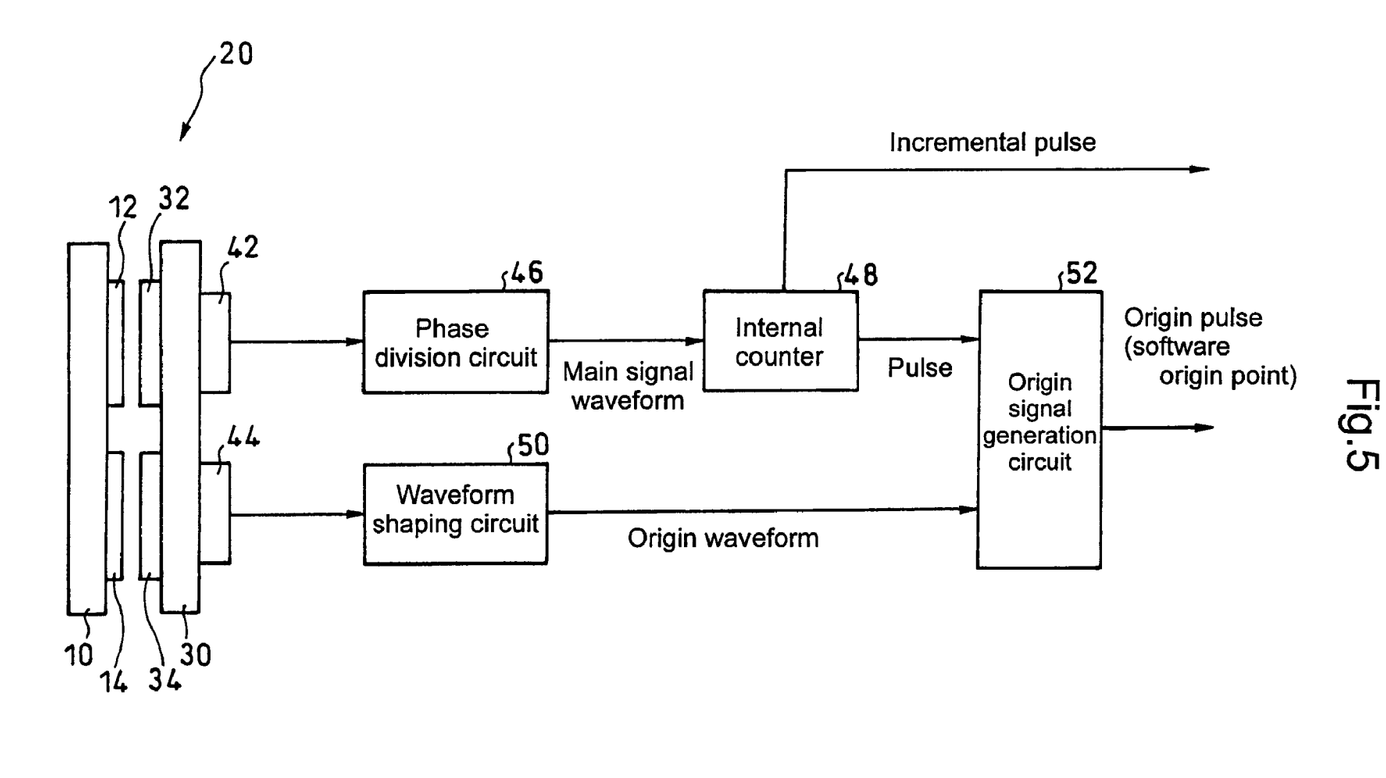
FIG. 5 is a block diagram showing the configuration of an exemplary embodiment of the present invention.
Figure 6:
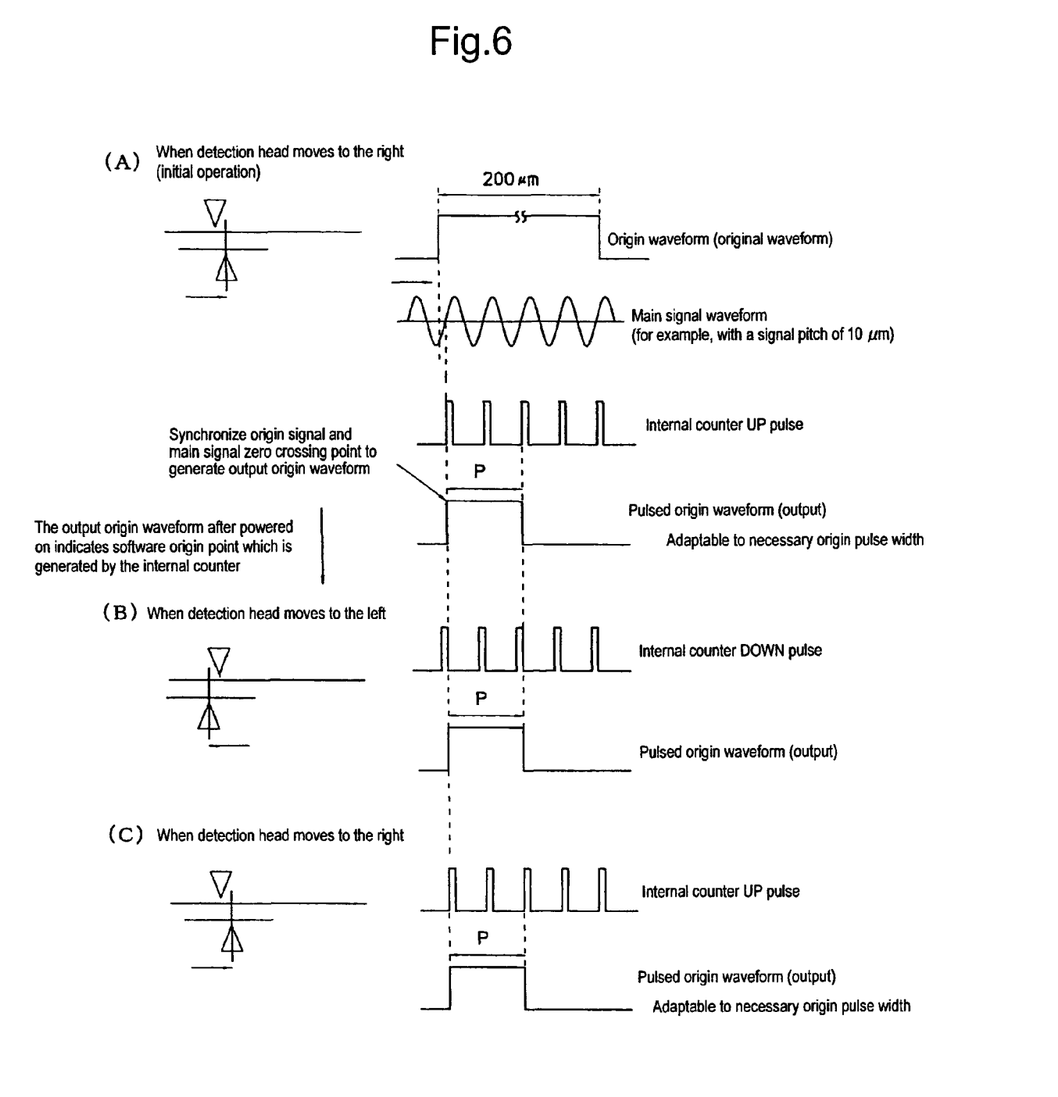
FIGS. 6A to 6C are waveform charts showing the operations of individual components according to the exemplary embodiment, for the case of a single-positioning origin.

As shown in FIG. 5, the present exemplary embodiment comprises a scale 10, a detection head 20, a phase division circuit 46, an internal counter 48, a waveform shaping circuit 50, and an origin signal generation circuit 52. The scale 10 has an incremental pattern 12 and an origin pattern 14. The detection head 20 includes an index scale 30 having an incremental pattern 32 and an origin pattern 34, a main signal light-receiving device 42, and an origin light-receiving device 44. The phase division circuit 46 divides the output of the main signal light-receiving device 42 in phase, thereby generating a main signal waveform having a signal pitch of, e.g., 10 μm as shown in FIG. 6A. The internal counter 48 counts up or down in accordance with the main signal waveform that is output from the phase division circuit 46. The waveform shaping circuit 50 shapes the waveform of the output from the origin light-receiving device 44, thereby generating an origin waveform (original waveform) such as shown in FIG. 6A. The origin signal generation circuit 52 is composed of programmable devices such as a CPLD. The origin signal generation circuit 52 is intended to generate and output, by software means, an origin pulse that rises in synchronization with the first zero crossing point of the main signal waveform within the range where the origin waveform obtained from the waveform shaping circuit 50 is on. Here, the origin pulse shall have a pulse width P as much as two pulses of the main signal, for example.

Hereinafter, the operation of the exemplary embodiment will be described. Initially, description will be given of the case with a single-positioning origin. When the detection head 20 moves to the right during an initial operation, the origin waveform and the main signal zero crossing point are synchronized into an output origin waveform, as shown in FIG. 6A. This output origin waveform, or pulsed origin waveform, is adaptable to a necessary origin pulse width P (in the diagram, as much as two pulses of the internal counter). As long as the power supply is on, the output origin waveform thereafter indicates an origin that is generated in the origin signal generation circuit 52 by software (referred to as software origin point), not in accordance with the actual signal but with the count value of the internal counter 48.

Then, when the detection head 20 moves to the left in the diagram, the origin pulse having the pulse width P is output by software in accordance with the DOWN pulses of the internal counter 48 as shown in FIG. 6B.

On the other hand, when the detection head 20 moves reversely to the right in the diagram, the origin pulse having the same pulse width P is output by software in accordance with the UP pulses of the internal counter 48 as shown in FIG. 6C.

In this way, the origin waveform is generated by software in accordance with the count value of the internal counter 48 irrespective of whether the movement is rightward or leftward. The origin waveform therefore remains unchanged in position and in pulse width.

Next, description will be given of the case with a bidirectional-positioning origin. When the detection head 20 moves to the right in the diagram, the origin pulse having the necessary pulse width P is output by software in synchronization with the rise of an UP pulse of the internal counter 48 as shown in FIG. 7A.

Figure 7:
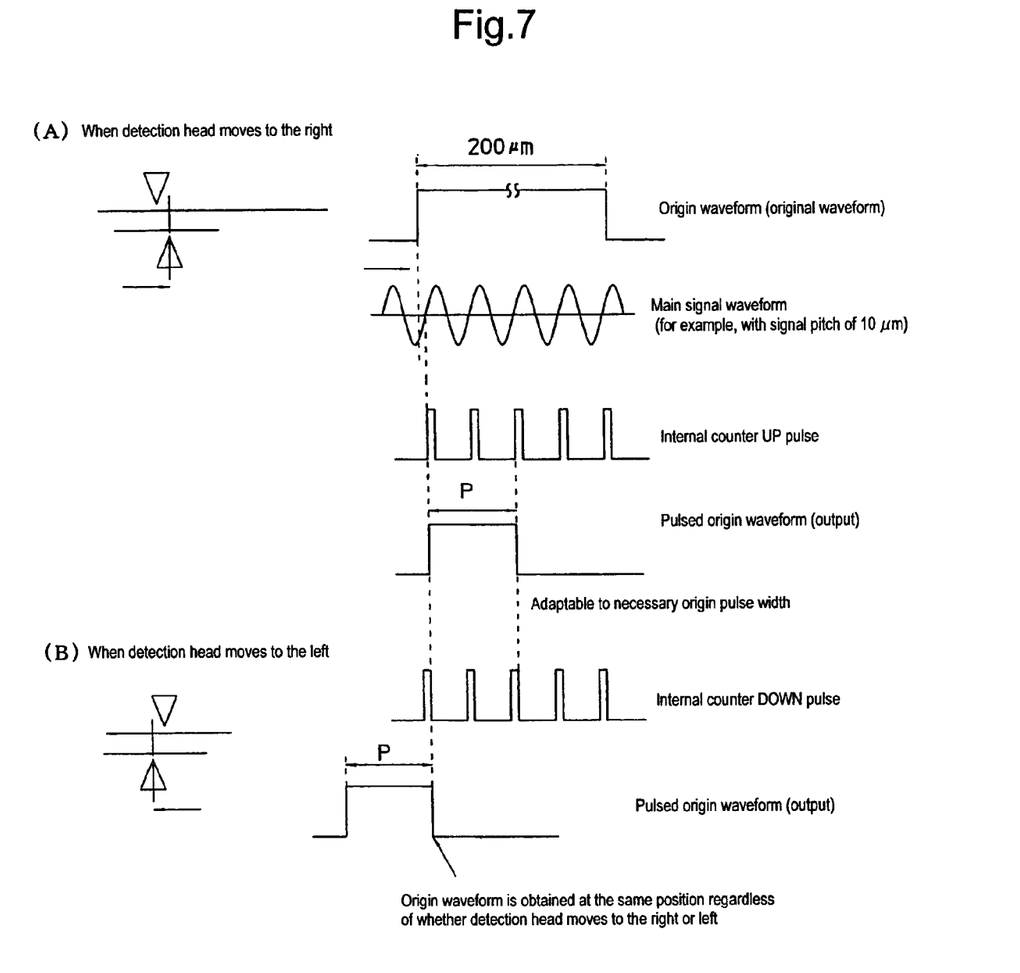
FIGS. 7A and 7B are waveform charts for the case of a bidirectional-positioning origin.

On the other hand, when the detection head 20 moves reversely to the left in the diagram, the origin pulse having the same pulse width P is output by software in synchronization with the rise of a DOWN pulse of the internal counter 48 so that it rises at the same position as the rising position of the above case as shown in FIG. 7B. Consequently, the origin waveform is obtained in the same position regardless of whether the detection head 20 is moving to the right or to the left.

It should be appreciated that in either of the cases with the single-positioning origin shown in FIGS. 6A to 6C and the bidirectional-positioning origin shown in FIGS. 7A and 7B, the counting direction of the detection head 20 is determined by the relationship between A and B phases of the analog waveforms obtained from the output of the main signal light-receiving device 42.

In the exemplary embodiment described above, the present invention is applied to an optical linear encoder of reflection type. Nevertheless, the present invention may be applied to linear encoders of other types such as transmission type, magnetic type, electromagnetic induction type, and electrostatic induction type, and even rotary encoders.

When an incremental signal having necessary resolution can be obtained directly from the main signal light-receiving device 42, the phase division circuit 46 may be omitted.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A method of generating an origin signal of an encoder having a scale on which an incremental pattern and an origin pattern are formed, the method comprising detecting a variable origin position during an initial operation following power-on of the encoder and memorizing said origin position, wherein the origin position detected during the initial operation after power-on of the encoder is a position of a detection head of the encoder at a time of power-on of the encoder, the origin position being a position of the encoder at a time of an immediately preceding power-off, and generating an origin signal having a necessary position and width by software based on the detected origin position and an origin waveform obtained from the origin pattern, wherein, the origin signal is generated in synchronization with a main signal waveform obtained from the incremental pattern, and the origin position detected during the initial operation following power-on of the encoder is indicated until a subsequent power-off of the encoder.

2. An apparatus for generating an origin signal of an encoder having a scale on which an incremental pattern and an origin pattern are formed, the apparatus comprising:

means for obtaining an origin waveform from the origin pattern;

means for storing a variable origin position and the width of the origin signal detected by an initial operation after power-on of the encoder, wherein the origin position detected by the initial operation after power-on of the encoder is a position of a detection head of the encoder at a time of power-on of the encoder, the origin position being a position of the encoder at a time of an immediately preceding power-off;

means for generating an origin signal having a necessary position and width by software based on the origin waveform;

means for obtaining a main signal waveform from the incremental pattern; and means for generating the origin signal in synchronization with the main signal waveform obtained from the incremental pattern.

3. The method of generating an origin signal of an encoder according to claim 1, wherein the origin position is detected during an initial operation following every power-on of the encoder.

* * * * *